United States Patent
Xi et al.

(10) Patent No.: US 9,214,175 B1
(45) Date of Patent: Dec. 15, 2015

(54) DATA STORAGE DEVICE CONFIGURING A GAIN OF A SERVO CONTROL SYSTEM FOR ACTUATING A HEAD OVER A DISK

(71) Applicant: Western Digital Technologies, Inc., Irvine, CA (US)

(72) Inventors: Wei Xi, Mission Viejo, CA (US); Yuanyuan Zhao, Lake Forest, CA (US); Michael Troy Nicholls, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/658,806

(22) Filed: Mar. 16, 2015

(51) Int. Cl.
*G11B 21/02* (2006.01)
*G11B 5/55* (2006.01)

(52) U.S. Cl.
CPC .................................. *G11B 5/5543* (2013.01)

(58) Field of Classification Search
None
See application file for complete search history.

(56) References Cited

U.S. PATENT DOCUMENTS

| | | | |
|---|---|---|---|
| 5,867,337 A | 2/1999 | Shimomura | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |

(Continued)

*Primary Examiner* — K. Wong

(57) ABSTRACT

A data storage device is disclosed comprising a first disk surface comprising servo data defining servo tracks at a first radial density, a first head, and a voice coil motor (VCM) configured to actuate the first head over the first disk surface using a servo control system. A load operation is executed to load the first head over the first disk surface, and a back electromotive force (BEMF) voltage generated by the VCM during the load operation is evaluated to generate an estimated distance traveled. The servo data on the first disk surface is detected, and an initial servo track during the load operation based on the detected servo data to generate a measured distance traveled. A gain of the servo control system is configured based on the estimated distance traveled and the measured distance traveled.

22 Claims, 5 Drawing Sheets

(56) References Cited

U.S. PATENT DOCUMENTS

| | | |
|---|---|---|
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,751,036 B2 | 6/2004 | Quak et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,943,972 B1 | 9/2005 | Chue et al. |
| 6,952,322 B1 | 10/2005 | Codilian et al. |
| 6,954,324 B1 | 10/2005 | Tu et al. |
| 6,956,710 B2 | 10/2005 | Yun et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |

(56) References Cited

U.S. PATENT DOCUMENTS

| | | |
|---|---|---|
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,982,993 B1 | 7/2011 | Tsai et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,085,487 B1 | 12/2011 | Jung et al. |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,599,510 B1 | 12/2013 | Fallone |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,941,945 B1 | 1/2015 | Chang et al. |
| 2005/0034539 A1* | 2/2005 | Tan et al. ............... 73/862.08 |
| 2009/0157848 A1 | 6/2009 | Khoo |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

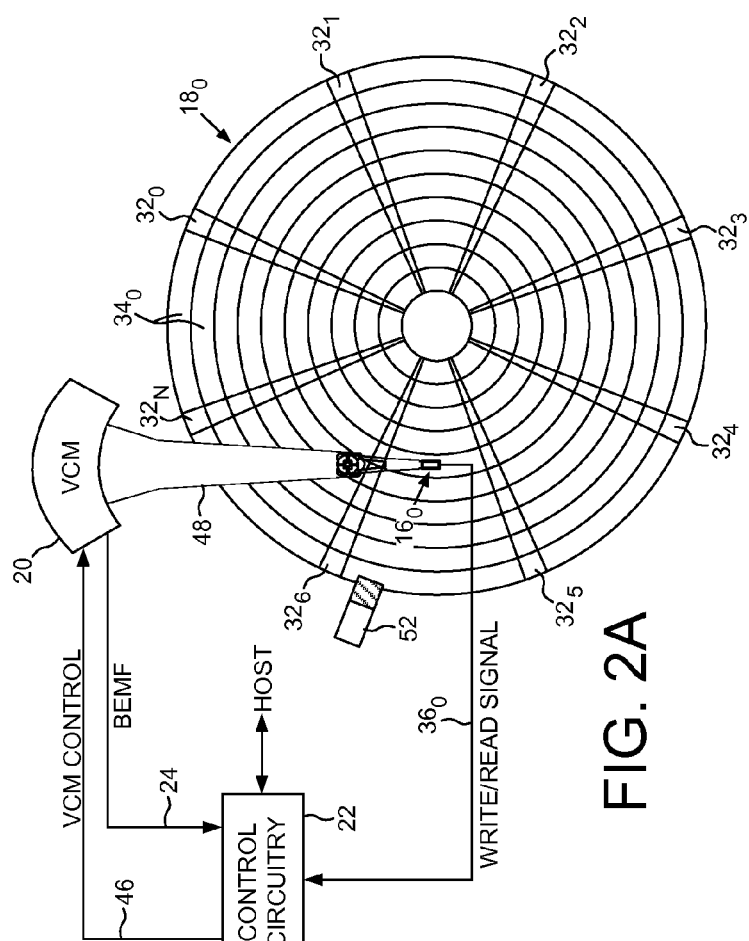
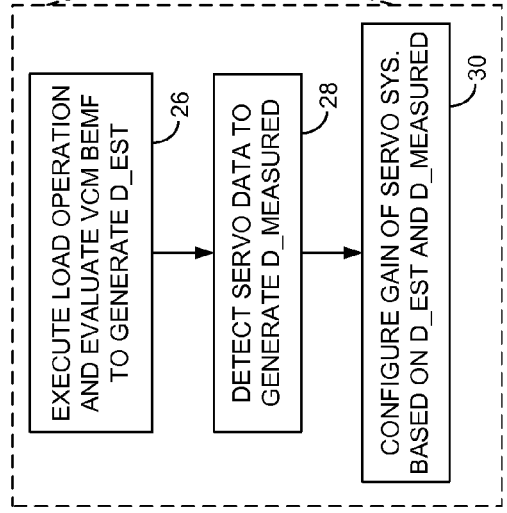
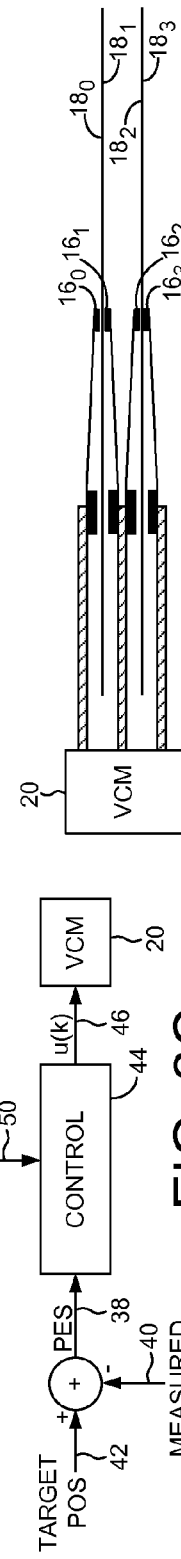
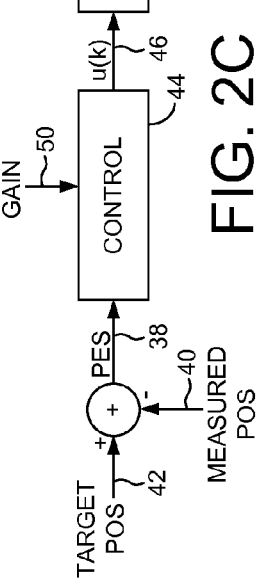

DATA STORAGE DEVICE CONFIGURING A GAIN OF A SERVO CONTROL SYSTEM FOR ACTUATING A HEAD OVER A DISK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive according to an embodiment comprising heads actuated over respective disk surfaces by a voice coil motor (VCM).

FIG. 2C shows a servo control system configured to control the VCM according to an embodiment.

FIG. 2D is a flow diagram according to an embodiment wherein a gain of the servo control system is configured based on an estimated distance traveled and a measured distance traveled.

DETAILED DESCRIPTION

Figure 1:
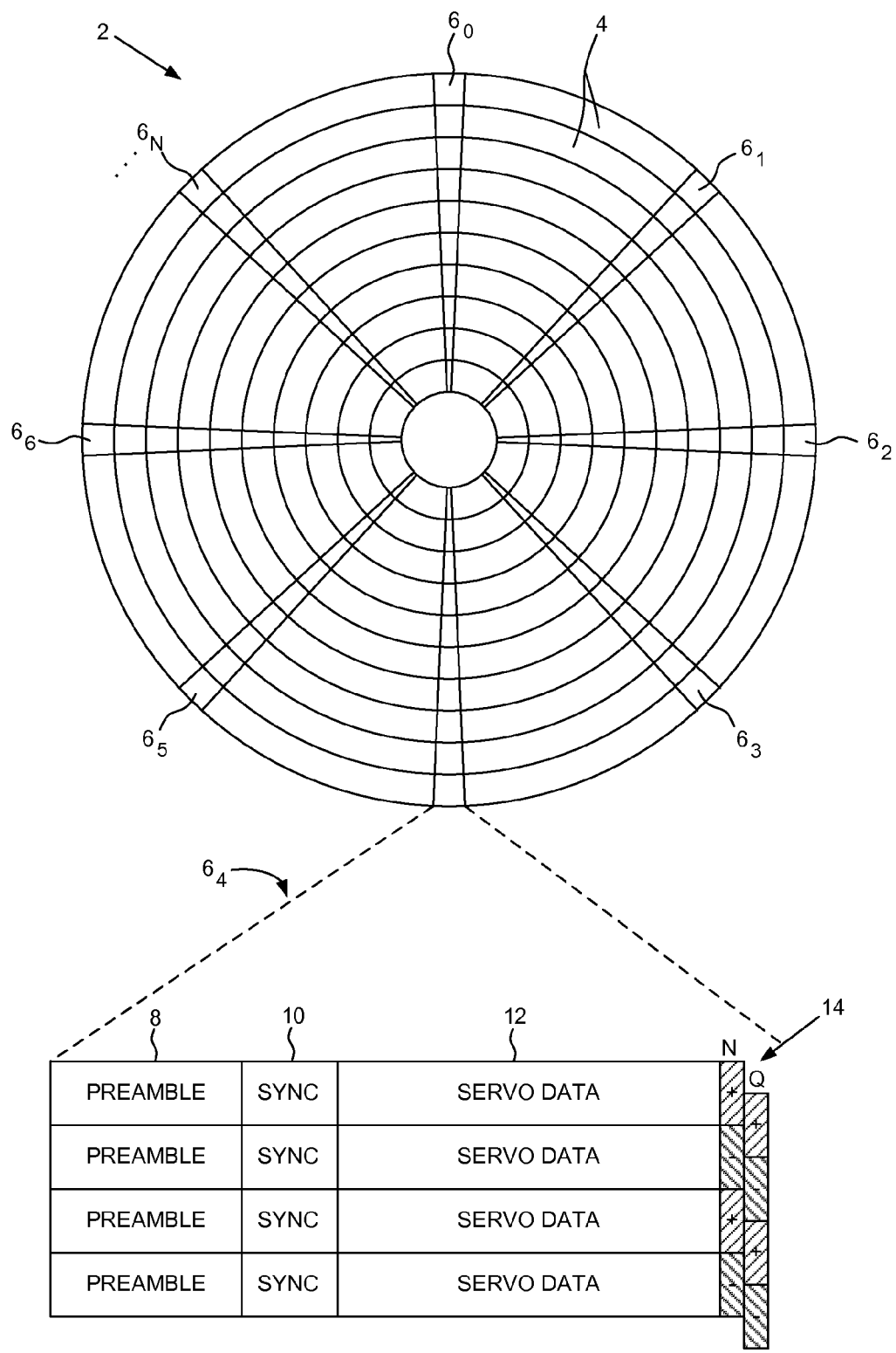
FIG. 1 shows a prior art disk format comprising a plurality of servo tracks defined by servo sectors.

FIGS. 2A and 2B show a data storage device in the form of a disk drive according to an embodiment comprising a first disk surface $18_0$ comprising servo data defining servo tracks at a first radial density, a first head $16_0$, and a voice coil motor (VCM) 20 configured to actuate the first head $16_0$ over the first disk surface $18_0$ using a servo control system (FIG. 2C). The disk drive further comprises control circuitry 22 configured to execute the flow diagram of FIG. 2D, wherein a load operation is executed to load the first head over the first disk surface, and a back electromotive force (BEMF) voltage 24 generated by the VCM during the load operation is evaluated to generate an estimated distance traveled (block 26). The servo data on the first disk surface is detected, and an initial servo track during the load operation is detected based on the detected servo data to generate a measured distance traveled (block 28). A gain of the servo control system is configured based on the estimated distance traveled and the measured distance traveled (block 30).

In the embodiment of FIG. 2A, the servo data on the first disk surface $18_0$ comprises servo sectors $32_0$-$32_N$ that define concentric servo tracks 34, wherein data tracks may be defined relative to the servo tracks at the same or different radial density. The control circuitry 22 processes a read signal $36_0$ emanating from the first head $16_0$ in order to demodulate the servo sectors $32_0$-$32_N$ into a position error signal (PES) 38 (FIG. 2C) representing a difference between a measured radial position 40 and a target radial position 42 of the first head $16_0$. A controller 44 in the servo control system filters the PES 38 using a suitable servo compensator to generate a control signal 46 applied to the VCM 20 which rotates an actuator arm 48 about a pivot in order to actuate the first head $16_0$ radially over the first disk surface $18_0$ in a direction that reduces the PES 38.

In one embodiment, the efficacy of the controller 44 to actuate the head radial over the disk (e.g., during seeking and tracking operations) depends on a configurable gain 50 that corresponds to a gain of the VCM 20. For example, the combined gain 50 of the controller and the gain of the VCM 20 may define a closed loop frequency response of the servo control system. In addition, the gain 50 of the servo control system may vary based on the radial density of the servo tracks on the disk surface being accessed. That is, in one embodiment the radial density of servo tracks on each disk surface may be configured relative to a nominal radial density of servo tracks. For example, in one embodiment the radial density of the servo tracks may be configured based on a width of the read element of the head, such as by increasing the radial density for a narrower read element. Increasing the radial density of the servo tracks on a disk surface increases the effective gain of the VCM 20 which requires a corresponding adjustment to the gain 50 of the controller 44.

In one embodiment, when the disk drive is powered on the control circuitry 22 shown in FIG. 2A executes a load operation to launch the head $16_0$ from a parked position on a ramp 52 over the disk surface $18_0$. Since the servo sectors $32_0$-$32_N$ have not yet been acquired, the servo control system operates in a velocity feedback loop wherein the velocity of the head is estimated based on the BEMF voltage 24 generated by the VCM 20. At some point during the load operation (e.g., when the velocity of the head $16_0$ approaches zero) the control circuitry 22 acquires the servo sectors $32_0$-$32_N$ and detects an initial servo track based on the servo sectors $32_0$-$32_N$. The servo control system is then configured into a position control loop such as shown in FIG. 2C in order to perform normal seek and tracking operations. However, if the gain of the controller 44 in the servo control system is misconfigured (e.g., relative to the radial density of the servo tracks) the servo control system may exhibit suboptimal performance or even become inoperable (e.g., become unstable). Accordingly, in one embodiment the controller 44 in the servo control system is configured with a suitable gain using one or a combination of techniques described herein, such as based on an estimated distance traveled and a measured distance traveled during a load operation as described above with reference to the flow diagram of FIG. 2D.

Figure 3:
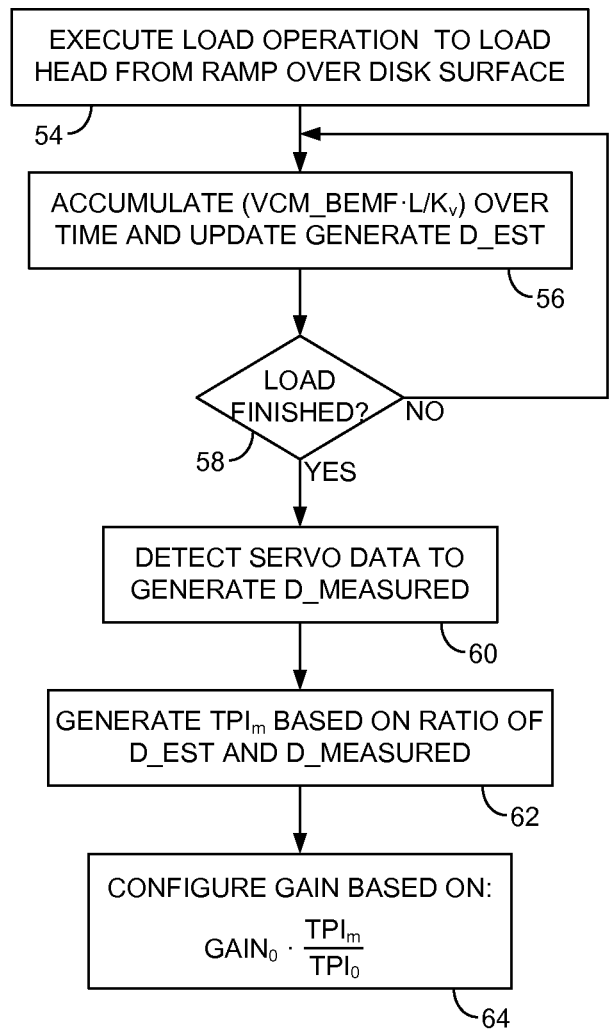
FIG. 3 is a flow diagram according to an embodiment wherein a back electromotive force (BEMF) voltage generated by the VCM is evaluated to generate the estimated distance traveled, the servo data on the disk surface is detected to generate the measured distance traveled, a radial density of the servo tracks on the first disk surface is measured based on a ratio of the estimated distance traveled and the measured distance traveled, and the gain of the servo control system is configured based on the measured radial density.

FIG. 3 shows a flow diagram according to an embodiment which extends on the flow diagram of FIG. 2D, wherein during a load operation (block 54) the VCM BEMF voltage is scaled by a constant, and the result accumulated in order to update an estimated distance traveled D_EST (block 56). For example, in one embodiment the estimated velocity $v_{est}$ of the head may be generated based on:

$$v_{est} = L\omega = \frac{L v_b}{K_v}$$

where L represents the length of the actuator arm 48, $V_b$ represents the VCM BEMF voltage, and $K_v$ is a nominal VCM motor velocity constant. Accordingly, in one embodiment accumulating the BEMF voltage scaled by $L/K_v$ over time generates the estimated distance traveled D_EST during the load operation.

When the load operation finishes (block 58), an initial servo track is detected by reading the servo sectors, wherein the initial servo track represents a measured distance traveled D_MEASURED (block 60). The radial density $TPI_m$ of the disk surface may be measured (block 62) in one embodiment based on:

$$TPI_m = \frac{D\_MEASURED}{D\_EST}$$

In one embodiment, the gain 50 of the controller 44 in the servo control system (FIG. 2C) may be configured (block 64) based on:

$$Gain_0 \cdot \frac{TPI_m}{TPI_0}$$

where $Gain_0$ represents a nominal gain, $TPI_m$ represents the measured radial density, and $TPI_0$ represents a nominal radial density. After configuring the gain of the controller 44 based on the above equation, the servo control system may perform an initial seek operation, for example, to seek the head to a configuration data track that may store values for additional configuration parameters.

In one embodiment, the nominal gain $Gain_0$ in the above equation is generated based on a nominal VCM motor torque constant $K_t$ and the nominal radial density $TPI_0$ (e.g., an average radial density). If the actual motor torque constant of the VCM 20 in FIG. 2A is significantly different than the nominal motor torque constant, there will be a corresponding error in the gain 50 configured based on the above equation. Accordingly, in one embodiment the gain 50 of the controller 44 may be initially configured using the above equation, and then updated based on an initial seek operation. In yet another embodiment, the gain 50 of the controller 44 may be periodically updated over multiple seek operations (e.g., the initial seek operation and subsequent seek operations).

In one embodiment, the dynamic of the VCM 20 may be modeled as:

$$\begin{cases} \frac{ds(t)}{dt} = v(t) \\ \frac{dv(t)}{dt} = K(u(t) + h(t)) \end{cases}$$

where S(t) and v(t) represent head the position and velocity respectively, u(t) represent the VCM control signal, h(t) represents an external disturbance (e.g. a bias force), and K represents the VCM motor torque constant. Assume S(0)=0 and v(0)=0 at t=0, and during a seek operation t∈[0,T], a predefined control signal u(t) is applied to the VCM 20 (where v(T)=0). From the above equation, at t=T and applying integration on both sides:

$$s(T) = K \int_0^T \int_0^{t'} (u(t) + d) \, dt \, dt' =$$

$$K \int_0^T \int_0^{t'} u(t) \, dt \, dt' + \frac{1}{2} K h T^2 v(T) = K\left( \int_0^T u(t) \, dt + hT \right)$$

With v(T)=0:

$$h = -\frac{1}{T} \int_0^T u(t) \, dt$$

and from the above equation:

$$s(T) = K \int_0^T \int_0^{t'} u(t) \, dt \, dt' - \frac{1}{2} KT \int_0^T u(t) \, dt$$

Therefore, in one embodiment the VCM motor torque constant can be estimated as $$K = \frac{s(T)}{\int_0^T \int_0^{t'} u(t) \, dt \, dt' - \frac{1}{2} T \int_0^T u(t) \, dt}$$

Since the servo control system is a discrete-time sampled system, the gain 50 of the controller 44 may be configured in one embodiment based on:

$$\frac{S}{\sum_1^N \sum_1^N u(k) - \frac{N}{2} \sum_1^N u(k)}$$

where S represents a seek distance and u(k) represents a control signal applied to the actuator (e.g., VCM) during the seek over N samples.

Figure 4:
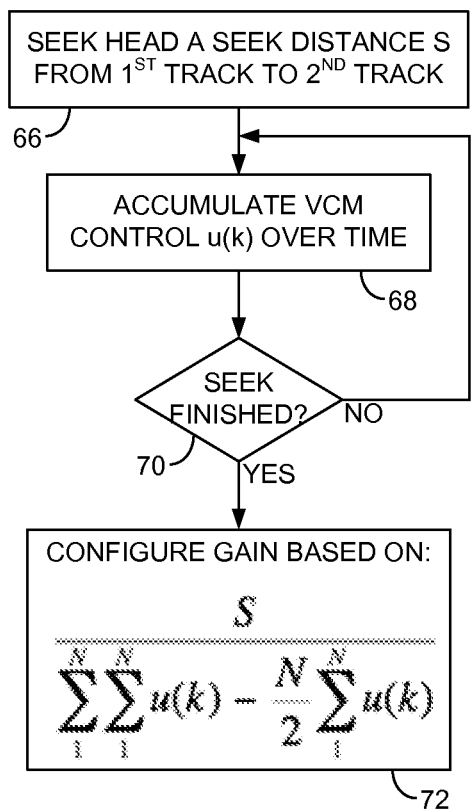
FIG. 4 is a flow diagram according to an embodiment wherein a gain of the servo control system is configured based on a seek distance and a control signal applied to an actuator (e.g., VCM) during a seek operation.

FIG. 4 is a flow diagram illustrating this embodiment wherein while the servo control system seeks the head a seek distance S from a first servo track to a second servo track (block 66), the control signal 46 applied to the VCM 20 is accumulated (block 68). When the seek operation is finished (block 70), the gain 50 of the controller 44 is configured based on the above equation (block 72). In one embodiment, the seek distance S at block 66 may correspond to an initial seek after the load operation and/or it may correspond to any other seek executed by the servo control system during normal operation. That is, in one embodiment the gain 50 of the controller 44 may be configured initially based on one or more seeks executed by the servo control system, and/or the gain 50 may be updated after being initially configured based on the measured radial density of the disk surface ($TPI_m$) as described above.

Figure 5:
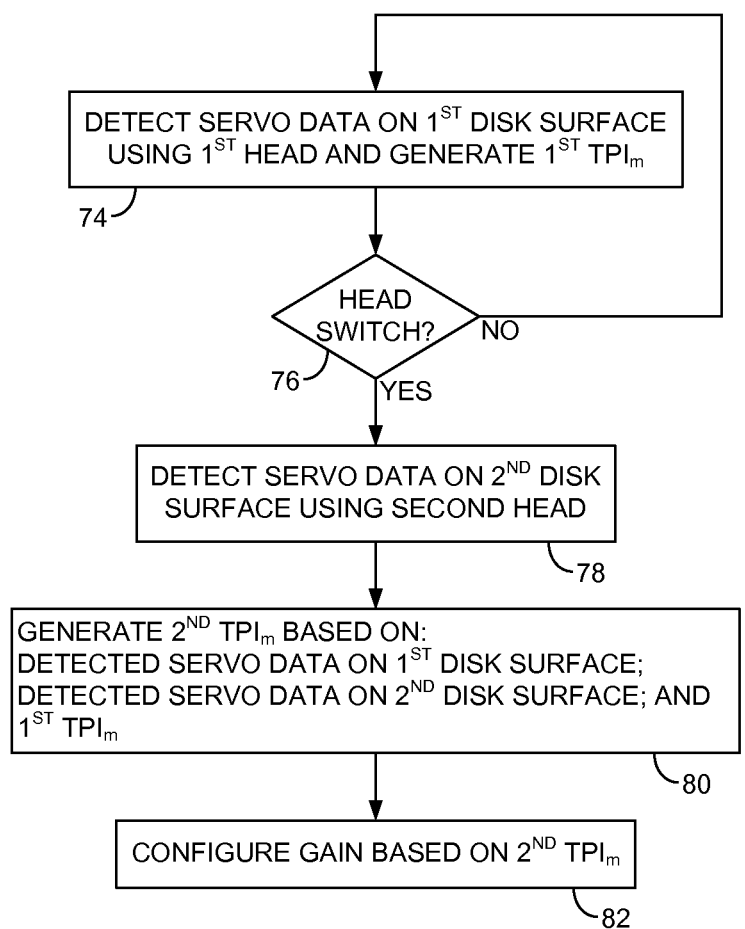
FIG. 5 is a flow diagram according to an embodiment wherein after executing a head switch operation to access a second disk surface, the gain of the servo control system is updated based on a measured radial density of servo tracks on the second disk surface.

In the embodiment where each disk surface may be recorded with a different radial density of servo tracks, the gain 50 of the controller 44 may be reconfigured when the control circuitry 22 executes a head switch operation in order to access a second disk surface having a different radial density of servo tracks from the first disk surface. FIG. 5 is a flow diagram illustrating this embodiment wherein a first measured radial density ($1^{st}\ TPI_m$) of a first disk surface is generated such as described above (block 74). When a head switch operation is executed to switch from the first head to the second head (block 76), the servo data on the second disk surface is detected using the second head (block 78). A second measured radial density ($2^{nd}\ TPI_m$) of the servo tracks on the second disk surface is generated based on the servo data detected on the first disk surface, the servo data detected on the second disk surface, and the first measured radial density ($1^{st}\ TPI_m$) of the servo tracks on the first disk surface (block 80). For example, in one embodiment the $2^{nd}\ TPI_m$ may be generated based on:

$$2^{nd}\ TPI_m = \frac{2^{nd}\ ServoTrack}{1^{st}\ ServoTrack}(1st\ TPI_m)$$

where $1^{st}$ ServoTrack represents the servo track on the first disk surface before the head switch and $2^{nd}$ ServoTrack represents the servo track on the second disk surface after the head switch.

In one embodiment, each disk surface may be recorded with a nominal radial density ($TPI_0$) of servo tracks rather than with a variable radial density. In this embodiment, the gain 50 of the controller 44 may be configured based on:

$$Gain_0 \cdot \frac{TPI_0}{TPI_m}$$

where $Gain_0$ represents a nominal gain and $TPI_m$ represents the measured radial density of the disk surface as described above. In this embodiment, the difference between the configured gain 50 and the nominal gain $Gain_0$ may be due to a difference between a nominal and actual VCM motor torque constant rather than a difference between a nominal and actual radial density of the servo tracks. Similar to the embodiments described above, after initially configuring the gain 50 of the controller 44 based on the above equation, the gain 50 may be updated in connection with executing one or more seek operations.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface comprising servo data defining servo tracks at a first radial density;
   a first head;
   a voice coil motor (VCM) configured to actuate the first head over the first disk surface; and
   control circuitry comprising a servo control system configured to control the VCM, the control circuitry configured to:
   execute a load operation to load the first head over the first disk surface;
   evaluate a back electromotive force (BEMF) voltage generated by the VCM during the load operation to generate an estimated distance traveled;
   detect the servo data on the first disk surface;
   detect an initial servo track during the load operation based on the detected servo data to generate a measured distance traveled; and
   configure a gain of the servo control system based on the estimated distance traveled and the measured distance traveled.

2. The data storage device as recited in claim 1, wherein the control circuitry is further configured to:
   generate a first measured radial density of the servo tracks on the first disk surface based on a ratio of the estimated distance traveled and the measured distance traveled; and
   configure the gain of the servo control system based on the first measured radial density.

3. The data storage device as recited in claim 2, wherein the control circuitry is further configured to configure the gain of the servo control system based on:

$$\text{Gain}_0 \cdot \frac{TPI_m}{TPI_0}$$

where $\text{Gain}_0$ represents a nominal gain, $TPI_m$ represents the first measured radial density, and $TPI_0$ represents a nominal radial density.

4. The data storage device as recited in claim 3, wherein the radial density of the servo tracks is different than $TPI_0$.

5. The data storage device as recited in claim 3, wherein the control circuitry is further configured to:
   seek the head a seek distance from a first track to a second track on the first disk surface; and
   update the gain of the servo control system based on:

$$\frac{S}{\sum\limits_{1}^{N}\sum\limits_{1}^{N} u(k) - \frac{N}{2}\sum\limits_{1}^{N} u(k)}$$

where S represents the seek distance and u(k) represents a control signal applied to the VCM during the seek over N samples.

6. The data storage device as recited in claim 2, wherein the control circuitry is further configured to configure the gain of the servo control system based on:

$$\text{Gain}_0 \cdot \frac{TPI_0}{TPI_m}$$

where $\text{Gain}_0$ represents a nominal gain, $TPI_m$ represents the first measured radial density, and $TPI_0$ represents a nominal radial density.

7. The data storage device as recited in claim 6, wherein the radial density of the servo tracks substantially equals $TPI_0$.

8. The data storage device as recited in claim 2, further comprising a second head actuated over a second disk surface comprising servo data defining servo tracks at a second radial density, wherein the control circuitry is further configured to:
   execute a head switch operation to switch from the first head to the second head;
   detect the servo data on the second disk surface; and
   generate a second measured radial density of the servo tracks on the second disk surface based on the servo data detected on the first disk surface, the servo data detected on the second disk surface, and the first measured radial density of the servo tracks on the first disk surface.

9. The data storage device as recited in claim 8, wherein the first radial density of the servo tracks on the first disk surface is substantially different from the second radial density of the servo tracks on the second disk surface.

10. The data storage device as recited in claim 8, wherein the control circuitry is further configured to update the gain of the servo control system after executing the head switch operation based on the second measured radial density of the servo tracks on the second disk surface.

11. A data storage device comprising:
    a disk surface comprising servo data defining servo tracks at a first radial density;
    a head;
    an actuator configured to actuate the head over the disk surface; and
    control circuitry comprising a servo control system configured to control the actuator, the control circuitry configured to:
    seek the head a seek distance from a first track to a second track on the disk surface; and
    configure a gain of the servo control system based on:

$$\frac{S}{\sum\limits_{1}^{N}\sum\limits_{1}^{N} u(k) - \frac{N}{2}\sum\limits_{1}^{N} u(k)}$$

where S represents the seek distance and u(k) represents a control signal applied to the actuator during the seek over N samples.

12. A method of operating a data storage device, the method comprising:
    executing a load operation to load a first head over a first disk surface using a voice coil motor (VCM);
    evaluating a back electromotive force (BEMF) voltage generated by the VCM during the load operation to generate an estimated distance traveled;
    detecting servo data on the first disk surface;
    detecting an initial servo track during the load operation based on the detected servo data to generate a measured distance traveled; and
    configuring a gain of a servo control system based on the estimated distance traveled and the measured distance traveled, wherein the servo control system is configured to control the VCM.

13. The method as recited in claim 12, further comprising:
    generating a first measured radial density of the servo tracks on the first disk surface based on a ratio of the estimated distance traveled and the measured distance traveled; and configuring the gain of the servo control system based on the first measured radial density.

14. The method as recited in claim 13, further comprising configuring the gain of the servo control system based on:

$$\text{Gain}_0 \cdot \frac{TPI_m}{TPI_0}$$

where $\text{Gain}_0$ represents a nominal gain, $TPI_m$ represents the first measured radial density, and $TPI_0$ represents a nominal radial density.

15. The method as recited in claim 14, wherein the radial density of the servo tracks is different than $TPI_0$.

16. The method as recited in claim 14, further comprising:
seeking the head a seek distance from a first track to a second track on the first disk surface; and
updating the gain of the servo control system based on:

$$\frac{S}{\sum_{1}^{N}\sum_{1}^{N} u(k) - \frac{N}{2}\sum_{1}^{N} u(k)}$$

where S represents the seek distance and u(k) represents a control signal applied to the VCM during the seek over N samples.

17. The method as recited in claim 13, further comprising configuring the gain of the servo control system based on:

$$\text{Gain}_0 \cdot \frac{TPI_0}{TPI_m}$$

where $\text{Gain}_0$ represents a nominal gain, $TPI_m$ represents the first measured radial density, and $TPI_0$ represents a nominal radial density.

18. The method as recited in claim 17, wherein the radial density of the servo tracks substantially equals $TPI_0$.

19. The method as recited in claim 13, further comprising:
executing a head switch operation to switch from the first head to a second head actuated over a second disk surface;
detecting servo data on the second disk surface; and
generating a second measured radial density of the servo tracks on the second disk surface based on the servo data detected on the first disk surface, the servo data detected on the second disk surface, and the first measured radial density of the servo tracks on the first disk surface.

20. The method as recited in claim 19, wherein the first radial density of the servo tracks on the first disk surface is substantially different from the second radial density of the servo tracks on the second disk surface.

21. The method as recited in claim 19, further comprising updating the gain of the servo control system after executing the head switch operation based on the second measured radial density of the servo tracks on the second disk surface.

22. A method of operating a data storage device, the method comprising:
using a servo control system to seek a head a seek distance from a first track to a second track on a disk surface; and
configuring a gain of the servo control system based on:

$$\frac{S}{\sum_{1}^{N}\sum_{1}^{N} u(k) - \frac{N}{2}\sum_{1}^{N} u(k)}$$

where S represents the seek distance and u(k) represents a control signal applied to an actuator during the seek over N samples.

* * * * *